Sept. 15, 1942.  R. B. COTTRELL  2,295,558
CAR TRUCK
Filed Oct. 29, 1941  2 Sheets-Sheet 1

INVENTOR.
Robert B. Cottrell
BY
ATTORNEY.

Sept. 15, 1942.   R. B. COTTRELL   2,295,558
CAR TRUCK
Filed Oct. 29, 1941   2 Sheets-Sheet 2
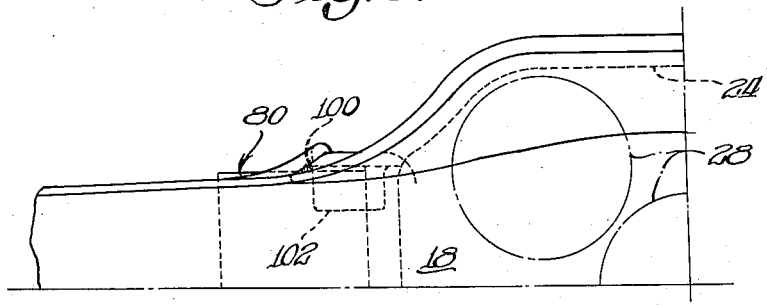
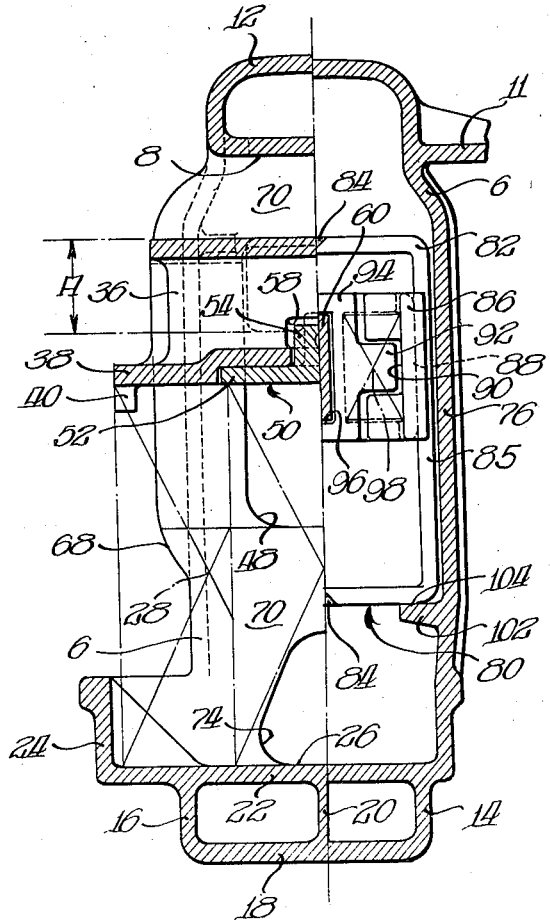
INVENTOR.
Robert B. Cottrell
BY
ATTORNEY:

Patented Sept. 15, 1942

2,295,558

UNITED STATES PATENT OFFICE 2,295,558

CAR TRUCK

Robert B. Cottrell, Chicago, Ill., assignor to American Steel Foundries, Chicago, Ill., a corporation of New Jersey Application October 29, 1941, Serial No. 416,956

19 Claims. (Cl. 105—197)

My invention relates to railway car trucks and especially to such a type of truck commonly utilizing spaced side frames and a connecting load carrying member or bolster.

My invention relates to a quick wheel change type of such truck wherein the bolster may conveniently be detached from either of the side frames without disturbing the spring group or other parts associated therewith.

The general object of my invention is to devise a novel form of quick wheel change high speed freight car truck suitable for utilization of long travel springs and adapted for convenient association with snubbing means which may be mounted in the respective side frame columns.

My novel arrangement utilizes an interlocking member connecting the side frame and bolster and said interlocking member also serves as actuating means for friction devices mounted in the respective side frame columns.

My novel truck contemplates an arrangement such as that described wherein the friction devices may each be formed as a unit and conveniently arranged for application to the side frame columns without interfering with other parts of the truck structure.

A different object of my invention is to devise a novel form of friction device particularly suitable for application to such a truck and my invention further comprehends such modifications of the side frame structure as will facilitate its adaptation for application of such a snubbing arrangement or friction device.

A different object of my invention is to devise a railway freight car truck wherein a portable friction unit may be associated with each column of the side frame for actuation by a member associated with the bolster and wherein said friction device may comprise a central operating member conveniently arranged for actuation of friction shoes engaging wear plates conveniently serving as housing means for the friction device and readily mountable in the side frame column.

Figure 1:
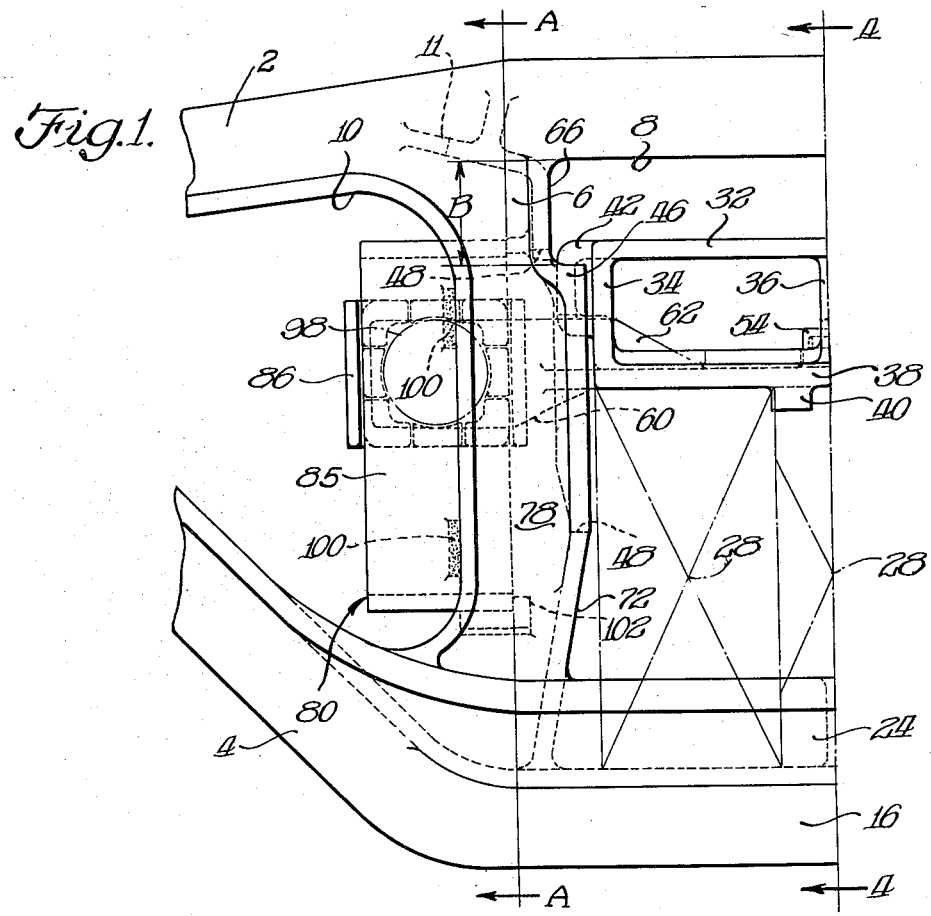

In the drawings Figure 1 is a fragmentary side elevation of a railway car truck embodying my invention only one end portion being shown inasmuch as the structure is similar at opposite ends of the truck.

Figure 2:
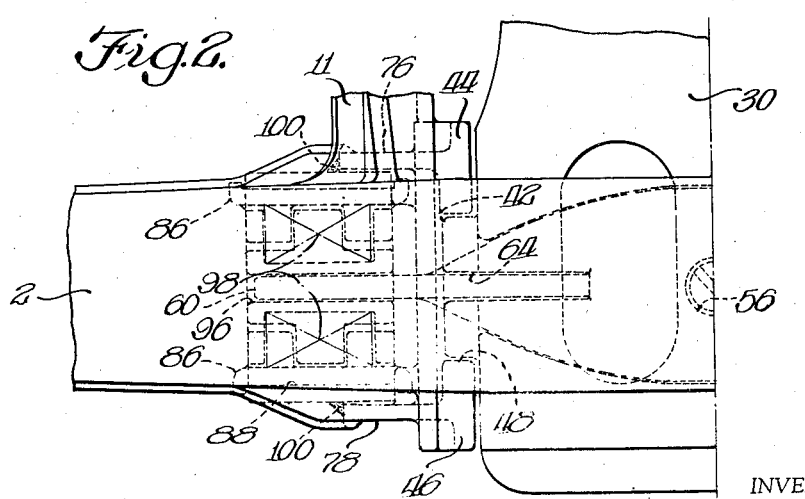

Figure 2 is a fragmentary top plan view of the structure shown in Figure 1.

Figure 3 is a fragmentary bottom plan view of the truck structure shown in Figures 1 and 2, and Figure 4 is a sectional view the left half thereof being a section taken substantially in the vertical plane bisecting the truck transversely and as indicated by the line 4—4 of Figure 1, while the right half thereof shows a further sectional view substantially in the transverse vertical plane indicated by the line A—A of Figure 1.

In detail my novel truck structure comprises a truss side frame having a compression member 2, a tension member 4, and the integral column 6 defining with said tension and compression members the central bolster opening 8 and the window opening 10, the side frame structure comprising also the usual integral brake hanger bracket 11 merging with the inboard wall of the column adjacent its juncture with the compression member.

Over the bolster opening the compression member may be of box-section as best seen at 12 in the sectional view at the left of Figure 4 and below said bolster opening the tension member may also be of box-section comprising the inboard wall 14, the outboard wall 16, the bottom chord 18, the longitudinal vertical central web 20, and the top chord 22, said top chord being widened and formed at each side with an upstanding flange 24 thus defining the spring seat 26 on which may be positioned a plurality of long travel coil springs diagrammatically indicated at 28, 28. The end of the bolster generally designated 30 may project into the bolster opening 8, said bolster end having a general box-section comprising the top wall 32, the lateral wall 34, the intermediate vertical web 36, and the bottom wall 38, said bottom wall being formed in the usual manner with depending lugs 40, 40 serving as positioning means for the coil springs 28, 28 on which said bolster may seat.

Along the upper portion of each bolster side wall and at an intermediate point thereof may be formed a guide pad 42 of generally rectangular form, said guide pad having a depth A (Figure 4) slightly less than the clearance B (Figure 1) between the upper extremity of the inboard and outboard guide portions formed on each side frame column and designated respectively 44 and 46 (Figure 2). The width of each bolster guide lug or pad 42 is slightly less than that of the window 48 formed in the upper portion of each column (Figure 4) for accommodation of said lug, said slot or opening 48 also accommodating the ends of the interlocking member generally designated 50.

The interlocking member and friction device actuator 50 comprises a flat central plate portion 52 recessed in the bottom wall 38 of the bolster, said central plate portion having arcuate edges with a general configuration best seen in the top plan view of Figure 2 and the recess in the bottom wall of the bolster being complementary thereto. The interlocking member plate portion 52 may be formed with a central upstanding lug 54, said lug projecting upwardly through the opening 56 (Figure 2) in the bottom wall of the bolster, a portion of the central rib 36 of said bolster being cored away as at 58 (Figure 4) to accommodate said lug and said lug being arranged for reception of a cotter key or other securing means for retaining said interlocking member and said bolster against accidental disengagement. The interlocking member 50 may have at each end thereof a vertical web or end portion 60 serving as an actuator arm for the adjacent friction device of plate-like form, said web 60 being continued into the horizontal plate portion 52 in the rib 62 which may merge with said plate portion 52, said rib 62 extending through an accommodating slot 64 (Figure 2) in the side wall and bottom wall of the bolster adjacent the bottom of the guide lug or pad 42.

The structure of each column 6 may best be understood by a comparison of the views of Figures 1, 2, and 4 wherein it may be noted that each column is formed with spaced bolster guide surfaces at opposite sides of the before-mentioned slot or window 48, said bolster guide surfaces terminating a distance below the top of the window opening for the purpose already described and thus defining a relieved guide portion of said window opening as indicated at 66 (Figure 1). The inboard and outboard column guide portions 44 and 46 are wide enough to afford relatively large bolster guide areas and said areas extend for a major portion of the length of the column tapering away at the bottom of the window opening as indicated at 68 (Figure 4). Below the window 48 the transverse web 70 of the column may be continuous from the inboard to the outboard side thereof and arranged on a slight diagonal as seen at 72 in Figure 1, said transverse web 70 being cored away as at 74 (Figure 4) immediately above the spring seat 26. It will thus be seen that in each column the transverse web 70 extends entirely across the column at the upper extremity of the bolster opening and adjacent the bottom thereof while intermediate portions of the column are of T-section, the tops of said T-sections defining the bolster guide portions and the legs of said T's comprising the inboard and outboard walls 76 and 78 at respective sides of the column, said inboard and outboard walls being continuous from top to bottom of the column and merging with the tension and compression members.

My novel form of friction device generally designated 80 may be a compact portable structure comprising at opposite sides thereof U-shaped plates 82, 82 welded at their abutting top and bottom edges as at 84, 84 (Figure 4) to form a yoke-like casing, each lateral wall 85 of which may serve as a wear plate. Housed within the yoke member, so formed, may be my novel friction device comprising inboard and outboard friction shoes 86, 86 flanged over at their lateral edges for interlocking slidable engagement with the adjacent wear plate 85. Each friction shoe 86 is a cup-like structure generally rectangular in form, the face of which may have slidable frictional engagement as at 88 with the adjacent wear plate portion 85 of the enclosing yoke. Each friction shoe may have its vertical and lateral walls centrally slotted as best seen at 90 in Figure 4 and within each slot may be received a projecting lug or finger 92 formed on the central carrier 94. The central carrier 94 is formed with a transverse slot 96 (Figure 2) for reception therewithin of the actuator arm 60 already described as an end portion of the interlocking member 50. Between each friction shoe 86 and the adjacent wall of the carrier 94 may be positioned a compression spring diagrammatically indicated at 98. The shoe carrier 94 thus is in interlocking relationship with the actuator arm 60 as well as with both friction shoes 86, 86 so that as the bolster moves vertically up or down such movement will be resisted by frictional engagement of the shoes 86, 86 against the side walls or wear plates 85, 85 of the yoke member which serves as a housing from the friction device.

With the parts of the friction device 80 assembled as a unit, said device may be inserted in the window opening 10 and slipped into position in proper assembled relationship between the inboard and outboard walls of the column and welded thereto at the top and bottom thereof as at 100, 100 along the vertical edges of said walls. It will be understood that this operation may take place with the bolster springs in position in the bolster opening and with the bolster and interlocking member seated on said springs with the actuator arm 60 of the interlocking member projecting through the aligned openings 48, 48 of the respective columns. As the friction device 80 is assembled into normal operative position the actuator arm 60 of the interlocking member will be slipped into the slot 96 of the shoe carrier 94 and the friction device 80. The inboard and outboard walls of each column may be formed with inwardly projecting lugs or shelves 102, 102 upon which the base or friction device 80 may seat as at 104 (Figure 4) prior to the welding thereof to the columns as already described.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and a resilient member compressed by and between each shoe and said carrier, each of said carriers having interlocking engagement with the adjacent shoes to prevent relative rotation thereof, said bolster having at opposite sides thereof guide lugs normally received between the spaced bolster guide surfaces of the adjacent column, said inboard bolster guide surfaces being spaced from said compression member a distance at least equal to the depth of said lugs to permit application or removal of said bolster at the top of said bolster opening.

2. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and resilient means compressed by and between said carrier and each shoe, the carriers of respective friction devices having slots aligned longitudinally of said frame for reception of the extremities of said actuating arms, said bolster having at opposite sides thereof guide lugs normally received between the spaced bolster guide surfaces of the adjacent column, said inboard bolster guide surfaces being spaced from said compression member a distance at least equal to the depth of said lugs to permit application or removal of said bolster at the top of said bolster opening.

3. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and resilient means under compression between each shoe and said carrier, said bolster having at opposite sides thereof guide lugs normally received between the spaced bolster guide surfaces of the adjacent column, said inboard bolster guide surfaces being spaced from said compression member a distance at least equal to the depth of said lugs to permit application or removal of said bolster at the top of said bolster opening.

4. In a railway car truck, a truss side frame having tension and compression members and spaced columns defining a bolster opening and spaced window openings, each of said columns having inboard and outboard walls and a transverse web comprising a slot, seats on the opposite walls of each column, friction units insertable in said window openings and fixed on said seats, springs on said tension member in said bolster opening, a bolster end on said springs, an interlocking member fixed between said bolster and said springs with actuating arms projecting through said slots for operation of said friction units, each of said friction units comprising a casing, shoes in frictional engagement with opposite walls thereof, a shoe carrier interlocked between opposite shoes, a slot in said carrier for reception of the adjacent actuating arm and resilient means under compression between said carrier and adjacent shoes, each of said columns having spaced bolster guide surfaces along intermediate areas, and said bolster having at each side thereof a guide lug normally received between said surfaces, said lug having a depth less than the clearance of the adjacent column guide surfaces from the compression member thereabove to permit application or dismantling of said bolster at the top of said bolster opening.

5. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, resilient means under compression between said carrier and each shoe, said bolster having at opposite sides thereof guide lugs normally received between the spaced bolster guide surfaces of the adjacent column, said inboard bolster guide surfaces being spaced from said compression member a distance at least equal to the depth of said lugs to permit application or removal of said bolster at the top of said bolster opening.

6. In a railway car truck, a side frame comprising spaced columns and an intervening bolster opening, inboard and outboard friction surfaces mounted on said frame, friction shoes in engagement with respective surfaces, a carrier between said shoes and interlocked therewith, resilient means between said carrier and each shoe, a spring group on said frame in said opening, a bolster supported on said group, and a member interlocked with said bolster and engaged with said carrier.

7. In a railway car truck, a truss side frame having tension and compression members and spaced columns defining a bolster opening and spaced window openings, each of said columns having inboard and outboard walls and a transverse web comprising a slot therethrough, seats on the opposite walls of each column, friction units insertable in said window openings and fixed on said seats, springs on said tension member in said bolster opening, a bolster end on said springs, and an interlocking member fixed between said bolster and said springs with actuating arms projecting through said slots for operation of said friction units, each of said friction units comprising a casing, shoes in frictional engagement with opposite walls thereof, a shoe carrier interlocked between opposite shoes, and resilient means compressed between said carrier and each shoe, a slot in said carrier for reception of the adjacent actuating arm, each of said columns having spaced bolster guide surfaces along intermediate areas, and said bolster having at each side thereof a guide lug normally received between said surfaces, said lug having a depth less than the clearance of the adjacent column guide surfaces from the compression member thereabove to permit application or dismantling of said bolster at the top of said bolster opening.

8. In a railway car truck, a side frame comprising spaced columns and an intervening bolster opening, inboard and outboard friction surfaces mounted on said frame, friction shoes in engagement with respective surfaces, a carrier between said shoes and interlocked therewith, resilient means between said carrier and each shoe, a spring group on said frame in said opening, a bolster supported on said group, and a member interlocked with said bolster and slidingly engaged with said carrier.

9. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and resilient means compressed between said carrier and each shoe, the carriers of respective friction devices having slots aligned longitudinally of said frame for reception of the extremities of said actuating arms.

10. In a railway car truck, a side frame comprising spaced columns and an intervening bolster opening, inboard and outboard friction surfaces on said frame, friction shoes in engagement with respective surfaces, a carrier between said shoes, alternately arranged interlocking means on each shoe and said carrier, resilient means under compression between each shoe and said carrier, a spring group on said frame in said opening, a bolster supported on said group, and a member interlocked with said bolster and engaged with said carrier.

11. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and a resilient member interposed between said carrier and each shoe, each of said carriers having interlocking engagement with the adjacent shoes to prevent relative rotation thereof.

12. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and resilient means under compression between each shoe and said carrier.

13. In a railway car truck, a side frame comprising spaced columns and an intervening bolster opening, a friction device supported from each column and comprising spaced friction surfaces, friction shoes in engagement with respective surfaces, a resilient member engaged with each shoe, and a carrier clamped by and between said resilient members, resilient means on said frame in said opening, a bolster supported on said resilient means, and an actuating member engaged with said bolster and with said carrier.

14. In a railway car truck, a truss side frame having tension and compression members and spaced columns defining a bolster opening and spaced window openings, each of said columns having inboard and outboard walls and a transverse web comprising a slot therethrough, seats on the opposite walls of each column, friction units insertable in said window openings and fixed on said seats, springs on said tension member in said bolster opening, a bolster end on said springs, and an interlocking member fixed between said bolster and said springs with actuating arms projecting through said slots for operation of said friction units, each of said friction units comprising a casing, shoes in frictional engagement with opposite walls thereof, a shoe carrier interlocked between opposite shoes, a slot in said carrier for reception of the adjacent actuating arm, and resilient means under compression between said carrier and adjacent shoes.

15. In a railway car truck, a truss side frame having tension and compression members and spaced columns defining a bolster opening and spaced window openings, each of said columns having inboard and outboard walls and a transverse web with a vertical slot, said transverse web comprising spaced bolster guide surfaces along intermediate portions thereof, friction devices mounted in said columns in alignment with said slots, springs on said tension member in said bolster opening, a bolster extending into said bolster opening and seated on said springs, and an interlocking member recessed in the bottom wall of said bolster and interlocked therewith, said interlocking member having actuating arms engaging said friction devices for actuation thereof, each of said friction devices comprising a yoke-like casing welded to the walls of the adjacent column, spaced shoes in frictional engagement with said casing, a carrier for said shoes, and resilient means compressed by and between each shoe and said carrier.

16. In a railway car truck, a truss side frame having tension and compression members and spaced columns defining a bolster opening and spaced window openings, each of said columns having inboard and outboard walls and a transverse web comprising a slot therethrough, seats on the opposite walls of each column, friction units insertable in said window openings and fixed on said seats, springs on said tension member in said bolster opening, a bolster end on said springs, and an interlocking member fixed between said bolster and said springs with actuating arms projecting through said slots for operation of said friction units, each of said friction units comprising a casing, shoes in frictional engagement with opposite walls thereof, a shoe carrier interlocked between opposite shoes, spring means between each shoe and said carrier, and a slot in said carrier for reception of the adjacent actuating arm.

17. In a railway car truck, a side frame comprising spaced columns and an intervening bolster opening, a friction device supported from each column and comprising spaced friction surfaces, friction shoes in engagement with respective surfaces, a resilient member engaged with each shoe, and a carrier clamped by and between said resilient members, resilient means on said frame in said opening, a bolster supported on said resilient means, and a member engaged with said bolster and slidingly engaged with said carrier.

18. In a railway car truck, a side frame comprising spaced columns and an intervening bolster opening, resilient means on said frame in said opening, a bolster in said opening and supported on said means, inboard and outboard friction surfaces supported from said frame, friction shoes in engagement with respective surtion shoes in engagement with respective surfaces, resilient means engaged with each shoe, a friction shoe carrier clamped by and between said last-mentioned means, interlocking means on said carrier and each shoe, and an actuating member engaged with said bolster and with said carrier.

19. In a railway car truck, a side frame comprising spaced columns and an intervening bolster opening, resilient means on said frame in said opening, a bolster in said opening and supported on said means, inboard and outboard friction surfaces supported from said frame, friction shoes in engagement with respective surfaces, a resilient member engaged with each shoe, a shoe carrier clamped by and between said resilient members, alternately arranged interlocking means on each shoe and the adjacent portion of said carrier, and an actuating member engaged with said bolster and slidably engaged with said carrier.

ROBERT B. COTTRELL.